United States Patent Office.

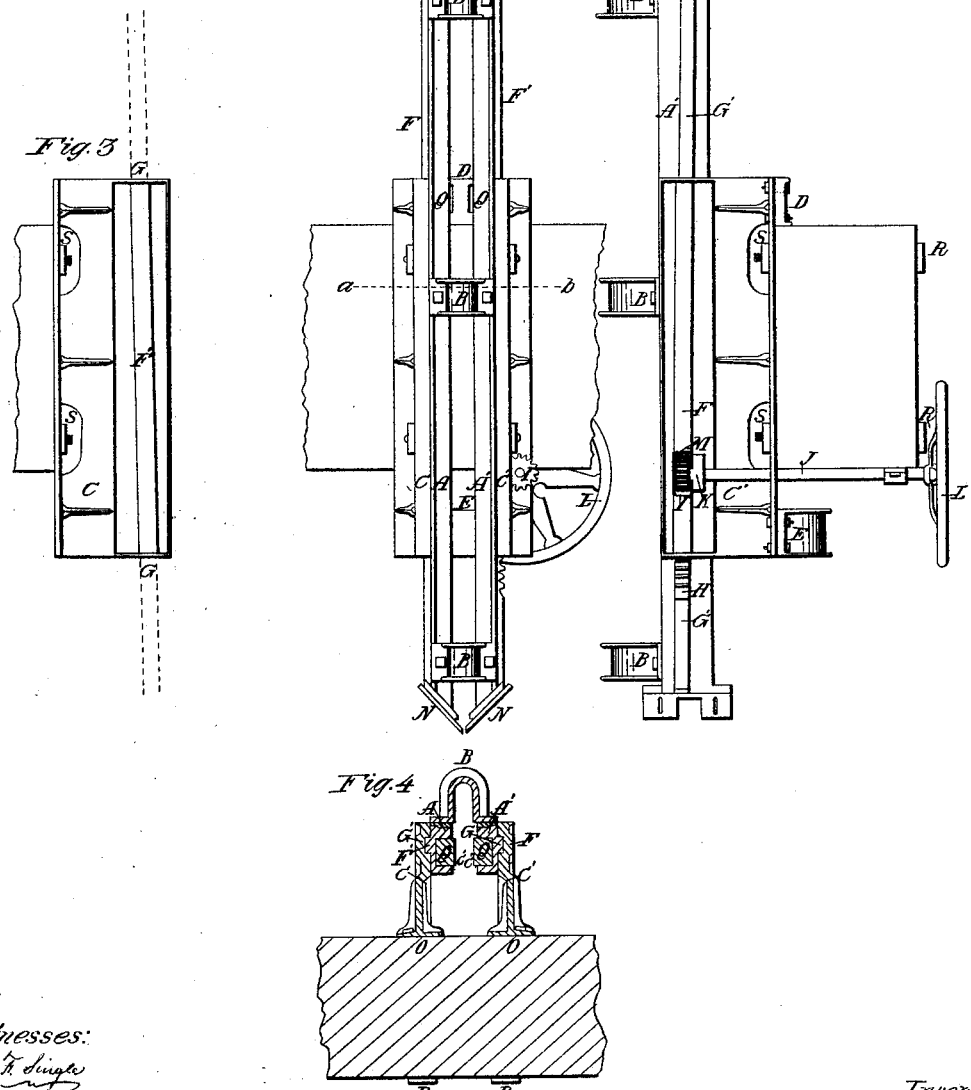

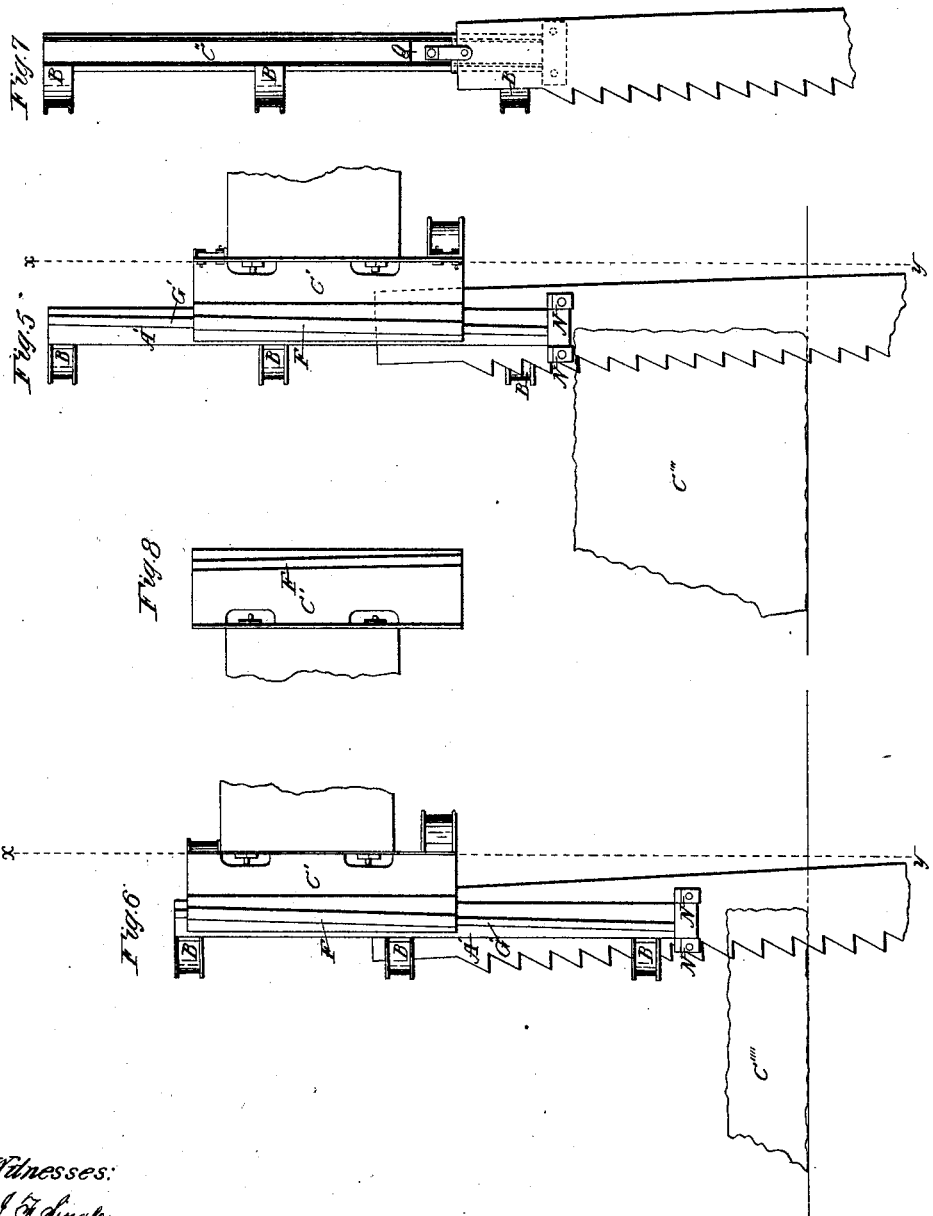

LEONARD ANDERSON, OF PAINESVILLE, OHIO.

Letters Patent No. 69,744, dated October 15, 1867.

IMPROVEMENT IN SAW-MILLS.

The Schedule referred to in these Letters Patent and making part of the same.

TO ALL WHOM IT MAY CONCERN:

Be it known that I, LEONARD ANDERSON, of Painesville, in the county of Lake, and State of Ohio, have invented a new and useful Improvement in Muley-Heads, for operating muley-saws, which I denominate a "self-adjusting rake device for upper muley-heads;" and I do hereby declare that the following is a full and exact description of the nature, construction, and operation thereof, reference being had to the accompanying drawings, in which—

Figure 1 is a front elevation of my said improved muley-head.

Figures 2 and 3, side elevations of the same.

Figure 4 a transverse section of fig. 1, in the line $a\ b$.

Figure 5, plate 2, represents so much of fig. 2 as will show the rake of the saw and position of the jaws of the saw-guides as set for a large log.

Figure 6, the same, as set for a log of smaller diameter.

Figure 7 is a side elevation of one of the coupled guides of the vibrating-frame, hereinafter described, showing the vertical slide-way, and the slide-block to which the head of the saw is attached, and Figure 8, one of the fixed guide-plates, hereinafter mentioned, showing the position of the diagonal groove therein—

The same letters of reference indicating like parts in all the drawings.

It is well understood by practical sawyers that to operate a saw so as to cut evenly throughout its entire length, the amount of its rake must be in proportion to the amount of feed carried. In sawing a log of large diameter, it is necessary to carry light or slow feed. For three-eighths of an inch to the stroke, the rake should be three-sixteenths to three-eighths of an inch, according to the character of the feeding device employed, such as "continuous feed," or "intermittent feed." In small logs, three-fourths of an inch, or more, feed to the stroke can be carried, the saw having from three-eighths to three-fourths of an inch rake. The nature of my invention, therefore, is a mode of adjusting the amount of rake of the saw to the size or diameter of the log to be cut, and that without loss of time, extra exertion, or even mental calculation on the part of the attendant, its operation being such that at the moment of elevating or lowering the saw-guides, to allow of the free passage of the log underneath, the amount of rake required for the saw is simultaneously imparted to it. This I accomplish by means of a frame moving between fixed guide-plates, and having vertical and lateral movements, said frame being provided with slide-ways, (one of which is represented by C'', fig. 7,) in which the slide-blocks of the cross-head of the saw move vertically, and also with diagonal tongues working in corresponding grooves in said guide-plates, as seen in fig. 8, so that by raising or lowering the said frame more or less rake is imparted to the saw, and at the same time allows the head of the saw to work vertically under all variations of rake; and further, that by placing the jaws (which carry the saw-guides) on the same frame, the saw is properly steadied on logs of varying diameters, wherever its head might be vibrating in its slide-ways, so that a long or short saw can be used in the said frame.

The following is a description of my said improved muley-head: A A', fig. 1, are two guides, coupled by arched ties B B B bolted thereto. Said guides are held and operated between a pair of guide-plates, C and C', fig. 2. The constructive form of said guides and guide-plates is sufficiently apparent in the figures. The rear part of the said guide-plates is securely coupled by a strap-plate, D, and the arched tie E. F, fig. 2, is a groove formed on the inside of the guide-plate C', a similar groove, F', being on the other guide-plate C, fig. 3. It will be observed that the said grooves are placed on the guide-plates diagonally with respect to their length, as seen in figs. 2 and 3. Fitting into said grooves are two tongues, G and G', fig. 1; these are formed on the sides of the guides in a diagonal direction, corresponding with the grooves before mentioned. It will be seen that the placing of the said tongues and grooves diagonally does not affect the vertical position of the guides when the same are moved up and down, as will be explained hereafter. The tongue G', fig. 2, is provided with a rack, H, extending a suitable distance along its length. I is a small pinion-wheel, placed on a shaft, J, supported in a bearing, K, cast on the guide-plate C', said shaft being operated by a hand-wheel, L. M is a small opening through the guide-plate C', for the purpose of allowing the pinion-wheel to take into the rack. The lower ends of the guides A A', fig. 1, have the usual sloping jaws for attaching the wooden saw-guides N N. C'' C'', fig. 4, are corresponding sliding grooves, extending the whole length of the inside of the guides A and A'. In these grooves, the slide-blocks Q Q (which receive the journals of the upper part of the saw) slide up and down with the motion of the saw. Each of the two guide-plates, C and C', figs. 2 and 3, with their broad soles O and O', fig. 4, and sunk diagonal grooves F and F', figs. 2 and 3, are cast whole, as also is each of the two guides A and A', with their long sliding grooves C'' C'', and tongues G and G', as shown in the transverse section, fig. 4.

The above-described machinery is secured to the main beam of the saw-mill frame by the long bolts R R, fig. 2, passing through the soles of the guide-plates, openings S S being left therein for the purpose of turning the nuts.

The operation is thus: The attendant elevates the saw-guides N N, by the hand-wheel L, and when the log is placed in position to be cut, he lowers them until they are far enough down to allow the log to travel. This act of lowering the guides, it will be seen, gives to the saw at the same moment, by means of the diagonal tongues referred to, the rake necessary for cutting the log, the lowering or raising of the saw-guides throwing the guides A A', and consequently the slide-blocks Q Q of the saw-bearings, more or less forward, the said guides remaining vertical under all changes. It will therefore be seen that whatever size the log happens to be, the rake of the saw is correspondingly adjusted, and that the guides A A' remain vertical whether carried forward or back. It will be seen, on reference to fig. 1, that the jaws, which carry the saw-guides N N, are placed and supported on the lower part of the frame A', and that they will therefore rise and fall with it. The advantage which I claim for this feature is, that wherever said jaws are set, be the log large or small, the saw will be properly steadied, whether its head is working high up or low down in the slide-ways, and that the same lengthened slide-ways will permit the use of a long or short saw. As the saw sometimes gets broken, and thereby becomes shorter, such, by the proper preparation of its broken end, can be used in the said frame, instead of being laid aside. To elucidate more fully how the rake of the saw is governed by the rise and fall of the frame, as before stated, the back edge of the saw is placed in juxtaposition with dotted vertical lines $x$ $y$ in figs. 5 and 6, fig. 5 showing a slight amount of rake, and fig. 6 a greater amount.

What I claim as new, and desire to secure by Letters Patent, is—

1. I claim the combination, in the frame A', of the vertical slide-ways C'', and diagonal tongues G G', operating substantially as and for the purpose herein specified.

2. I claim the vertical slide-ways C'', when used to guide and carry the head of the saw, and at the same time to carry or support the jaws of the saw-guides N N, substantially as and for the purpose herein set forth.

LEONARD ANDERSON.

Witnesses:
J. F. SINGLE,
M. S. HARVEY.